C. WILLIAMS.
PUMP BARREL.
APPLICATION FILED SEPT. 23, 1910.
997,351. Patented July 11, 1911.
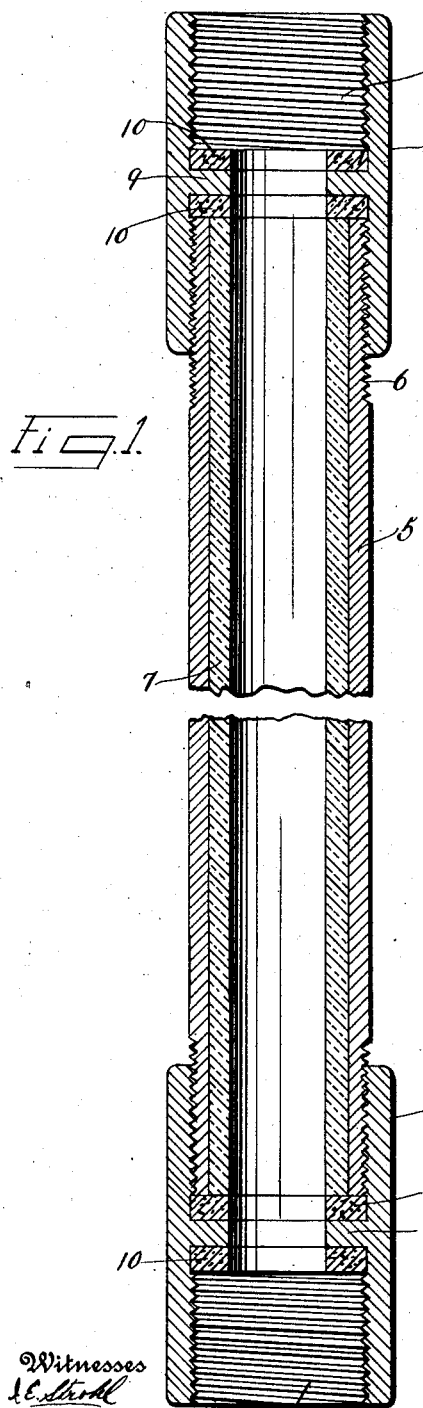
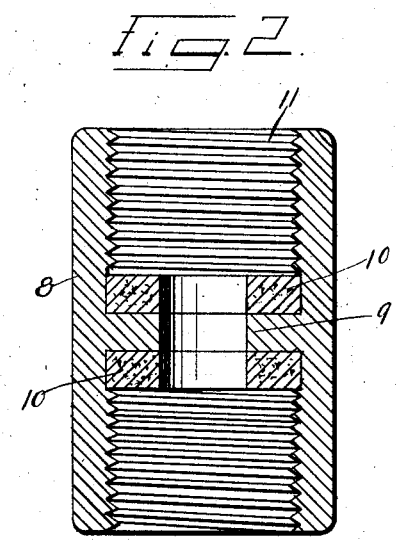
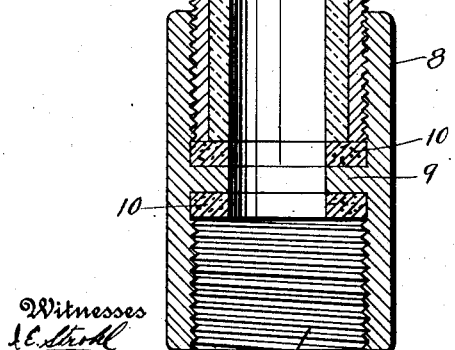

UNITED STATES PATENT OFFICE.

CLEM WILLIAMS, OF BLUFFTON, INDIANA.

PUMP-BARREL.

997,351.   Specification of Letters Patent.   Patented July 11, 1911.

Application filed September 23, 1910. Serial No. 583,475.

*To all whom it may concern:*

Be it known that I, CLEM WILLIAMS, a citizen of the United States, residing at Bluffton, in the county of Wells, State of Indiana, have invented certain new and useful Improvements in Pump-Barrels; and I do hereby declare the following to be a full, clear, and exact description of the invention, such as will enable others skilled in the art to which it appertains to make and use the same.

This invention relates to improvements in pump barrels and the leading object in view is the provision of a pump barrel with a glass lining and packing means for rigidly holding the lining in place against movement in the pump barrel.

Another object of the invention is the construction of a pump barrel having a tubular glass lining inserted therein and sleeves threaded on the ends of the pump barrel and the glass lining whereby said ends are effectively sealed against leakage of the fluid passing through the pump barrel.

With the above and other objects in view the invention consists in certain combinations, constructions and arrangements of parts, clearly described in the following specification and clearly illustrated in the accompanying drawings, in which:—

Figure 1 is a longitudinal central sectional view through a pump barrel constructed in accordance with my invention. Fig. 2 is a central longitudinal sectional view of one of the connecting sleeves.

Referring to the accompanying drawings 5 denotes a pump barrel having external screw threads 6 on its ends. Within the pump barrel 5 a tubular glass lining 7 removably but closely fits, the ends of said lining terminating flush with the ends of the pump barrel 5 and said lining having a smooth peripheral surface and a smooth inner surface, whereby the glass lining will slide readily in the pump barrel and it will offer little resistance to the flow of the liquid moving under pressure in the pump barrel. The pump barrel 5 may be made in a number of sections or in a single piece. A sleeve 8 having internal screw threads is threaded on the end of the pump barrel and said sleeve is formed with an internal circular shoulder 9. An annular packing member 10 is disposed against the shoulder 9 and is adapted to be compressed against the adjoining ends of the pump barrel 5 and the tubular glass lining 7, by means of the sleeve 8. The sleeve 8 is also formed with internal screw threads 11 which may be connected to a second pump barrel section and a second packing ring may be disposed against the other side of the shoulder 9 to seal the adjoining ends of the second pump barrel section and the tubular glass lining inserted therein. The internal diameter of the shoulder 9 is the same as the internal diameter of the glass lining 7 so the inner peripheral surface 9 will be flush with the inner internal peripheral surface of the glass lining 7 and consequently the resistance of friction of the joint will be very small. This arrangement however may be varied if desired so that the shoulder can overlap the glass lining.

What is claimed is:—

A pump barrel provided with a glass lining closely and removably disposed therein, said glass lining having a smooth internal surface and its ends terminating flush with the ends of the pump barrel, a packing ring disposed against the adjoining ends of the pump barrel and the glass lining, and a connecting sleeve having an internal circular shoulder bearing firmly against the packing ring to seal the adjoining ends of the glass lining and the pump barrel, the internal shoulder of the sleeve having the same diameter as the internal diameter of the glass lining whereby little resistance is offered to the flow of liquid.

In testimony whereof, I affix my signature, in presence of two witnesses.

CLEM WILLIAMS.

Witnesses:
JOHN GODFREY,
JAMES KIRKWOOD.

Copies of this patent may be obtained for five cents each, by addressing the "Commissioner of Patents, Washington, D. C."